United States Patent
Ravichandran et al.

(10) Patent No.: US 11,643,081 B2
(45) Date of Patent: *May 9, 2023

(54) MANAGEMENT OF TRANSMISSION TRANSITIONS IN WHEEL TORQUE-BASED ACTUATOR TORQUE DETERMINATION SYSTEM

(71) Applicant: Ford Global Technologies, LLC, Dearborn, MI (US)

(72) Inventors: Maruthi Thiruninravur Ravichandran, Dearborn, MI (US); Judhajit Roy, Royal Oak, MI (US); Jason Meyer, Canton, MI (US); Rajit Johri, San Francisco, CA (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/209,624

(22) Filed: Mar. 23, 2021

(65) Prior Publication Data

US 2022/0306107 A1 Sep. 29, 2022

(51) Int. Cl.
*B60W 10/06* (2006.01)
*B60W 30/188* (2012.01)
(Continued)

(52) U.S. Cl.
CPC ........ *B60W 30/188* (2013.01); *B60W 10/026* (2013.01); *B60W 10/06* (2013.01);
(Continued)

(58) Field of Classification Search
CPC .. B60W 30/188; B60W 10/026; B60W 10/06; B60W 2710/025; B60W 2540/106;
(Continued)

(56) References Cited

U.S. PATENT DOCUMENTS

| 6,679,807 B2 | 1/2004 | Kato et al. |
| 9,056,613 B2 | 6/2015 | Johri et al. |

(Continued)

FOREIGN PATENT DOCUMENTS

WO WO-2019167508 A1 * 9/2019 ............. F16H 61/14

*Primary Examiner* — Roger L Pang
(74) *Attorney, Agent, or Firm* — Burris Law, PLLC

(57) ABSTRACT

Systems and control methods can provide for determining a TrnAin torque request from desired vehicle acceleration in a vehicle that utilizes a WTC architecture to allow for smooth transition between different transmission states, such as torque converter bypass clutch states and shifts between transmission gear ratios. The methods provide consistent and smooth vehicle acceleration profile during transmission state transitions. The methods also provide the ability to track the desired vehicle acceleration consistently from virtual driver demand sources, such as adaptive cruise control, autonomous vehicle, or remote parking, without allocating any additional resource to account for transmission state transitions. The proposed methods are applicable to any TC-based automatic transmission drivetrain, such as conventional powertrain, MHT, P4 HEV, or even BEV powertrains where the motor is located on the impeller side of a torque converter.

13 Claims, 4 Drawing Sheets

(51) Int. Cl.
  *B60W 10/02* (2006.01)
  *B60W 30/19* (2012.01)
  *B60W 10/11* (2012.01)

(52) U.S. Cl.
  CPC ............ *B60W 10/11* (2013.01); *B60W 30/19* (2013.01); *B60W 2510/0241* (2013.01); *B60W 2510/0275* (2013.01); *B60W 2530/00* (2013.01); *B60W 2540/10* (2013.01); *B60W 2540/106* (2013.01); *B60W 2552/05* (2020.02); *B60W 2555/00* (2020.02); *B60W 2710/025* (2013.01); *B60W 2710/0666* (2013.01); *B60W 2710/1005* (2013.01); *B60W 2720/106* (2013.01); *B60Y 2200/92* (2013.01)

(58) Field of Classification Search
  CPC ....... B60W 2540/10; B60W 2720/106; B60W 2710/0666; B60W 2510/0241; B60W 2030/203; B60W 2030/206; B60W 2510/0275; B60W 10/04; B60W 10/08; B60W 2510/0208
  See application file for complete search history.

(56) References Cited

U.S. PATENT DOCUMENTS

| | | | |
|---|---|---|---|
| 9,242,630 B2 | 1/2016 | Mitchell et al. | |
| 10,106,148 B2 | 10/2018 | Meyer et al. | |
| 2007/0246274 A1* | 10/2007 | Dreibholz | B60W 20/00 180/65.25 |
| 2018/0050609 A1* | 2/2018 | Meyer | B60L 50/61 |
| 2020/0216071 A1* | 7/2020 | Chen | B60W 10/08 |
| 2020/0232557 A1* | 7/2020 | Xu | B60W 10/02 |
| 2021/0354681 A1* | 11/2021 | Roy | F16H 61/143 |

* cited by examiner

MANAGEMENT OF TRANSMISSION TRANSITIONS IN WHEEL TORQUE-BASED ACTUATOR TORQUE DETERMINATION SYSTEM

FIELD

The present disclosure relates to the management of transmission transitions in a wheel torque-based actuator torque determination system.

BACKGROUND

This section provides background information related to the present disclosure which is not necessarily prior art.

A vehicle having a conventional powertrain typically includes an internal combustion engine as the sole source of rotary power, a multi-speed transmission, and a torque converter that is employed to transmit rotary power between the internal combustion engine and the transmission. Powertrain controls for such vehicles typically control the total torque that is provided to the input of the transmission (i.e., transmission assembly input, abbreviated herein as "TrnAin" or "TRNAIN") as a function of the driver pedal request and the rotational speed of the input torque (i.e., the rotational speed of the crankshaft of the internal combustion engine or the rotational speed of the impeller of the torque converter).

Powertrain controls for vehicles powered solely by an internal combustion engine typically employ a total torque requested (TrnAin torque requested). While this architecture is entirely satisfactory for vehicles that employ a conventional powertrain, the Applicant has noted several drawbacks when such architecture is proposed for use in a vehicle having two or more sources of propulsive power. Such vehicles include, for example, series hybrid powertrains (e.g., the modular hybrid transmission currently manufactured by Ford Motor Company of Dearborn, Mich.), as well as P3 hybrids, which place an electric motor in the drivetrain of the vehicle, and P4 hybrids that place an electric motor in an axle that is not driven by the powertrain.

The rotational speed of the input torque changes rapidly during the course of a shift between gear ratios in the transmission. Consequently, the TrnAin torque request is modified significantly during the course of a shift between gear ratios in the transmission. At present, these modifications are determined with use of calibration-intensive switching and blending strategies, which can be relatively costly and laborious to produce. In the case of hybrid drivetrain configurations, it is also necessary to coordinate between the total input torque (TrnAin torque), the torque request that is input to the downstream actuator (i.e., the electric motor that powers the driveline or a separate axle) and the vehicle speed to ensure that shifts between gear ratios in the transmission take place in a manner that does not cause potential losses in fuel economy.

To address these issues, the Applicant developed a wheel torque-based powertrain control (WTC) architecture in which the driver demand is interpreted in the vehicle acceleration domain as a function of the driver pedal request, the vehicle speed, and the current/target transmission gear. The desired vehicle acceleration is then translated to the actuator torque request using a physics-based model of the powertrain. Accordingly, the WTC architecture decouples the TrnAin torque request from the TrnAin speed and coordinates the torque requests of all drivetrain actuators.

A key challenge in implementing a WTC architecture concerns the management of the TrnAin torque during transitional states of the powertrain, such as transitions in the state of the torque converter or during the course of a shift between gear ratios in the transmission. The management of the TrnAin torque during transitional states of the powertrain provides desired vehicle response during the course of these transitional states, thereby avoiding situations where a vehicle operator may perceive the vehicle as experiencing inconsistent acceleration or a jerky shift as the transitional state of the powertrain is traversed.

The system and method of the present disclosure overcome these and other issues associated with management of transmission transitions.

SUMMARY

This section provides a general summary of the disclosure, and is not a comprehensive disclosure of its full scope or all of its features.

In one form, the present disclosure provides a method for controlling a source of propulsive rotary power in a vehicle powertrain. The vehicle powertrain has a transmission and a torque converter that is disposed in a power path between the source of rotary power and the transmission. The method includes: determining a compensated TRNAIN torque request, the compensated TRNAIN torque request including an inertia compensation component that is indicative of a torque transmitted through the torque converter over a fluid path that is disposed between an input of the torque converter and an output of the torque converter; and operating the source of rotary power to satisfy the compensated TRNAIN torque request when the torque converter is operating in a slipping state.

According to an optional form, prior to determining the compensated TRNAIN torque request, the method includes determining a sub-state of the slipping state in which the torque converter is operating and determining an estimate of the torque converter clutch torque [$T_{qTC,\ clutch}(t)$] based in part on the sub-state of the slipping state in which the torque converter is operating.

In another optional form, the estimate of the torque converter clutch torque [$T_{qTC,\ clutch}(t)$] is related to an amount of slip or relative rotation between the input of the torque converter and the output of the torque converter when the torque converter is operating in a first sub-state of the slipping state.

In yet another optional form, the first sub-state of the slipping state comprises a sub-state selected from a group of sub-states consisting of: a slip control sub-state, a capacity control sub-state, and a transition-out-of-open sub-state.

In still another optional form, the estimate of the torque converter clutch torque [$T_{qTC,\ clutch}(t)$] is determined from the formula:

$$Tq_{TC,clutch}(t) = Tq_{tu,dd}(t) - Tq_{TC,fluid,dd}(t)$$

where:

$T_{qTC,\ clutch}(t)$ is the torque converter clutch torque;
$T_{qtu,dd}(t)$ is the torque converter desired torque; and
$T_{qTC,\ fluid,\ dd}(t)$ is the portion of the torque converter desired torque that is transmitted through the fluid path of the torque converter.

In a further optional form, the estimate of the torque converter clutch torque [$T_{qTC,\ clutch}(t)$] is proportional to a torque capacity of a torque converter clutch [$T_{qTC,\ clutch,\ capacity}(t)$] when the torque converter is operating in a second sub-state of the slipping state.

In yet another optional form, the second sub-state of the slipping state comprises a sub-state selected from a group of sub-states consisting of: a transition-to-open sub-state and a fast open sub-state.

In still a further optional form, the estimate of the torque converter clutch torque [$T_{qTC,\ clutch}(t)$] is determined from the formula:

$$Tq_{TC,clutch}(t)=Tq_{TC,clutch,capacity}(t)\mathrm{sign}(Tq_{tu,dd}(t))$$

where:

$T_{qTC,\ clutch}(t)$ is the torque converter clutch torque;
$T_{qTC,\ clutch,\ capacity}(t)$ is the torque capacity of the torque converter clutch; and $T_{qtu,dd}(t)$ is the torque converter desired torque.

In yet a further optional form, the estimate of the torque converter clutch torque [$T_{qTC,\ clutch}(t)$] is proportional to a torque capacity of a torque converter clutch [$T_{qTC,\ clutch,\ capacity}(t)$] when the torque converter is operating in a first sub-state of the slipping state.

In another optional form, the first sub-state of the slipping state comprises a sub-state selected from a group of sub-states consisting of: a transition-to-open sub-state and a fast open sub-state.

In still another optional form, the estimate of the torque converter clutch torque [$T_{qTC,\ clutch}(t)$] is determined from the formula:

$$Tq_{TC,clutch}(t)=Tq_{TC,clutch,capacity}(t)\mathrm{sign}(Tq_{tu,dd}(t))$$

where:

$T_{qTC,\ clutch}(t)$ is the torque converter clutch torque;
$T_{qTC,\ clutch,\ capacity}(t)$ is the torque capacity of the torque converter clutch; and $T_{qtu,dd}(t)$ is the torque converter desired torque.

In another form, the present disclosure provides a method for controlling a source of propulsive rotary power in a vehicle powertrain. The vehicle powertrain having a transmission with a plurality of gear ratios. The method includes: modifying a TRNAIN torque request to include an inertia compensation torque when the transmission is being shifted between a first one of the plurality of gear ratios and a second one of the plurality of gear ratios; and operating the source of propulsive rotary power to satisfy the inertia compensation torque-modified TRNAIN torque request as the transmission is shifted between the first one of the plurality of gear ratios and the second one of the plurality of gear ratios.

In one optional form, changes to the TRNAIN torque request when the transmission is being shifted between a first one of the plurality of gear ratios and a second one of the plurality of gear ratios are responsive only to changes in a displacement of an accelerator pedal, or to changes in a rate of displacement of the accelerator pedal, or to both changes in the displacement of the accelerator pedal and change in a rate of displacement of the accelerator pedal.

In another optional form, modifying the TRNAIN torque request to include the inertia compensation torque comprises applying a low-pass filter to a turbine speed [$\omega_{tu}$].

In still another optional form, modifying the TRNAIN torque request to include the inertia compensation torque comprises blending a value of a desired vehicle acceleration [$a_{veh,dd}$] from a table of the first one of the plurality of gear ratios to a table of the second one of the plurality of gear ratios.

In yet another optional form, modifying the TRNAIN torque request to include the inertia compensation torque comprises blending a value of a transmission gear ratio [$rt_{gearbox}$] from a magnitude of the gear ratio of the first one of the plurality of gear ratios and from a magnitude of the gear ratio of the second one of the plurality of gear ratios.

In a further optional form, the method includes determining a traction mode in which the vehicle is being operated, and employing a calibration routine that is specific to the traction mode in which the vehicle is being operated to modify the TRNAIN torque request to fill a torque hole.

In still a further optional form, one of the traction modes is a normal mode, wherein another one of traction modes is a sport mode, and wherein the calibration routine that is employed for the sport mode to fill the torque hole is not as smooth and therefore provides jerkier vehicle acceleration response than the calibration routine that is employed for the normal mode to fill the torque hole.

In still another optional form, determining the traction mode in which the vehicle is being operated is based on at least one of a manually provided driver input and automatically through inference by a vehicle control system.

In a further optional form, the vehicle control system infers a traction mode based at least partly on a GPS position data set for the vehicle.

In yet another optional form, the vehicle control system infers that the traction mode is a sport mode when the GPS position data set for the vehicle is indicative of the vehicle being located on a racetrack.

In yet a further optional form, the modified TRNAIN torque request is responsive to a desired acceleration and wherein the desired vehicle acceleration is based on a manually provided driver input, an input from a cruise control system, or an input from an automated vehicle system.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Figure 6:
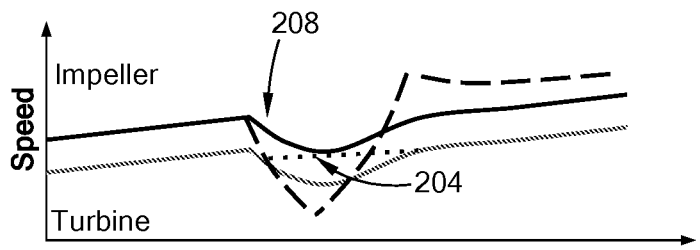
Figure 7:
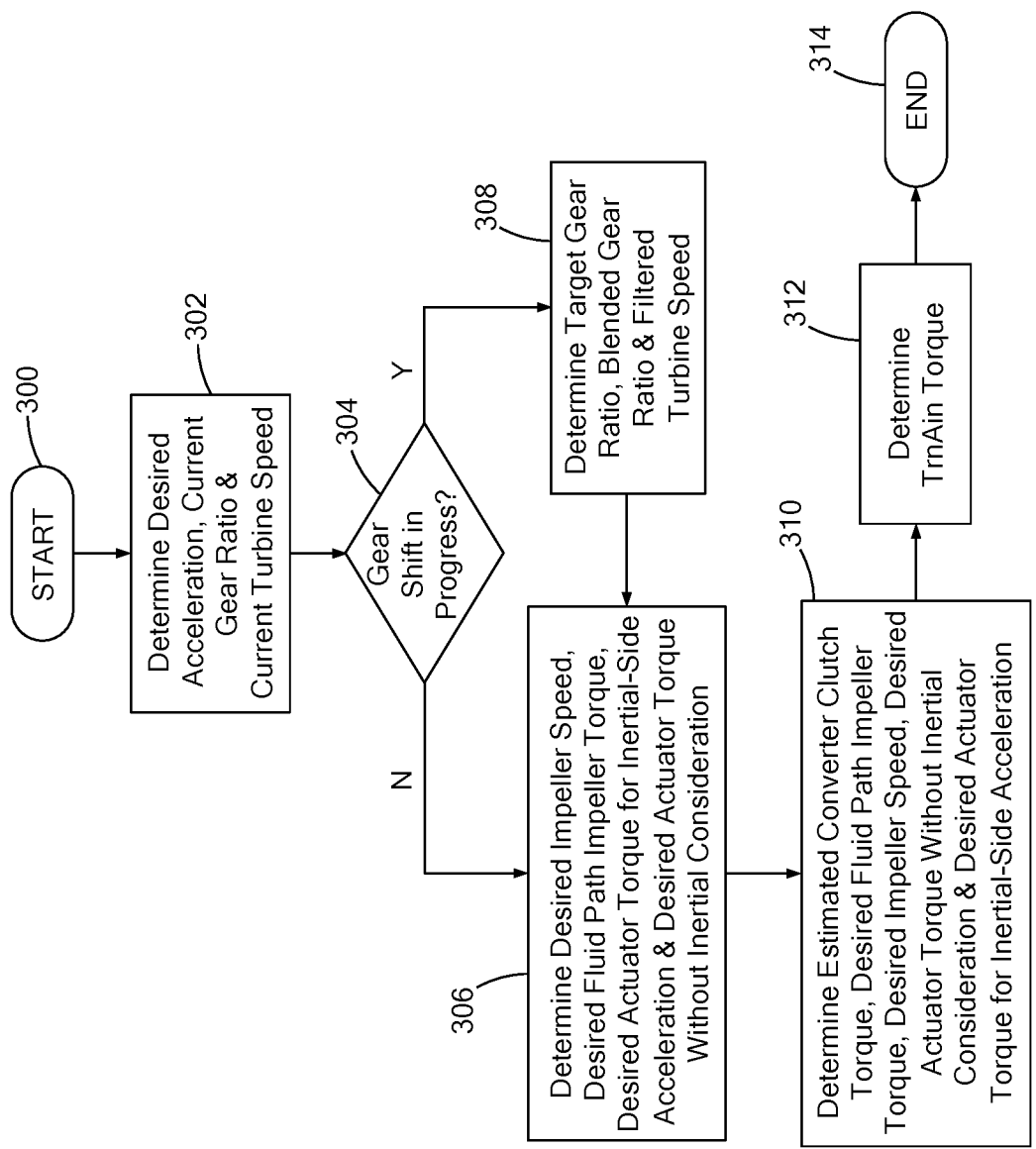

FIG. 6 is a plot that depicts the rotational speed as a function of time for an impeller and a turbine of a torque converter of the powertrain when the transmission of the powertrain is shifted from an off-going gear ratio to an on-coming gear ratio; and FIG. 7 is a schematic illustration in flowchart form of a method performed in accordance with the teachings of the present disclosure for determining an inertia compensation in a WTC architecture for instances where a transmission of a powertrain of the vehicle is shifted between two gear ratios.

Corresponding reference numerals indicate corresponding parts throughout the several views of the drawings.

DETAILED DESCRIPTION

The present disclosure relates to a wheel torque-based powertrain control (WTC) architecture in which the driver demand is interpreted in the vehicle acceleration domain as a function of the driver pedal request, the vehicle speed, and the current/target transmission gear. More specifically, the present disclosure relates to advanced inertia compensation in a WTC architecture.

In the particular example provided, a vehicle 10 is illustrated having a powertrain 12 and a driveline 14. The powertrain 12 includes an internal combustion engine 20, a torque converter 22, a transmission 24, and a controller 26, while the driveline 14 includes a first differential 28, which transmits rotary power from the powertrain 12 to a set of first vehicle wheels 30, and an electric drive unit 32 that is drivingly coupled to a set of second vehicle wheels 34. Those of skill in the art will appreciate that the vehicle 10 is an example of a P4 hybrid vehicle, in which the set of first vehicle wheels 30 are operated on a full-time basis by the powertrain 12, and the set of second vehicle wheels 34 are employed to selectively drive the set of second vehicle wheels 34. It will be appreciated, however, that the teachings of the present disclosure have application to other vehicle configurations, including other types of hybrid vehicle configurations as well as to a vehicle configuration that only employs an internal combustion engine to provide propulsive power to a driveline (through a torque converter and a transmission).

The internal combustion engine 20, the torque converter 22, the transmission 24, the first differential 28 and the electric drive unit 32 can be conventional in their construction and as such, need not be discussed in detail herein. Briefly, the internal combustion engine 20 is configured to convert a fuel into rotational motion that is employed to drive an output (i.e., crankshaft 38) of the internal combustion engine 20.

The torque converter 22 has an impeller 40, which is driven by the crankshaft 38, a stator 42, a turbine 44, which is coupled to an input 46 of the transmission 24, and a lock-up clutch 48. The torque converter 22 can be operated in an unlocked mode or in a locked mode. In the unlocked mode, the lock-up clutch 48 permits relative rotation between the impeller 40 and the turbine 44. In the unlocked mode, rotation of the impeller 40 creates a flow of fluid that is circulated through the stator 42 to drive the turbine 44 at a reduced speed relative to the impeller 40. Consequently, the input 46 of the transmission 24 is driven at a reduced rotational speed relative to the crankshaft 38 when the torque converter 22 is operated in an unlocked mode. In the locked mode, lock-up clutch 48 rotationally couples the turbine 44 to the impeller 40 so that the input 46 the transmission 24 is driven at the rotational speed of the crankshaft 38. However, there may be instances where the torque converter 22 is operated in the locked mode but some relative rotation (i.e., slipping) occurs between the impeller 40 and the turbine 44.

The transmission 24 includes a transmission output 50 and a plurality of gear ratios 52 (the gear ratios 52 include their respective clutches) that can be selectively engaged to change the gear ratio between the input 46 and the transmission output 50. Rotary power output through the transmission output 50 is employed to drive the first differential 28.

The first differential 28 is configured to transmit rotary power received from the transmission 24 to the set of first vehicle wheels 30. The first differential 28 is an open differential in the example provided, but it will be appreciated that the first differential 28 could be equipped with limited slip and/or locking capabilities if desired. The first differential 28 has a pair of differential output members 60, each of which being rotationally coupled to an associated one of the set of first vehicle wheels 30 through a half-shaft 62.

The electric drive unit 32 includes an electric motor 70, a drive unit transmission 72, and a second differential 74. The electric motor 70 can be any type of electric motor 70 and is selectively coupled to a power source, such as a battery (not shown). The drive unit transmission 72 provides a gear reduction between the electric motor 70 and the second differential 74. The drive unit transmission 72 can provided a fixed gear reduction, or could be configured as a multi-speed transmission that is capable of providing two or more different gear reductions, or could be configured to provide a gear reduction that can be varied between two distinct gear ratios. Rotary power output from the drive unit transmission 72 is employed to drive the second differential 74.

The second differential 74 is configured to transmit rotary power received from the drive unit transmission 72 to the set of second vehicle wheels 34. The second differential 74 is an open differential in the example provided, but it will be appreciated that the second differential 74 could be equipped with limited slip and/or locking capabilities if desired. The second differential 74 has a pair of differential output members 76, each of which being rotationally coupled to an associated one of the set of second vehicle wheels 34 through an axle shaft 78.

The controller 26 is configured to receive data on various parameters of vehicle 10, including various parameters of the internal combustion engine 20, the torque converter 22 and the transmission 24, and to control the operation of the vehicle 10 and its components in response thereto. In particular, the controller 26 is configured to control the internal combustion engine 20, the lock-up clutch 48 of the torque converter 22 and the transmission 24 to satisfy the TrnAin torque. A non-limiting example of the various parameters that are communicated to the controller 26 includes the acceleration of the vehicle 10, the rotational speed of the crankshaft 38 of the internal combustion engine 20, the rotational speed of the impeller 40 of the torque converter 22, the gear ratio 52 in which the transmission 24 is operating.

Inertia Compensation of WTC Architecture for Slipping Torque Converter

When the torque converter 22 is operated in the locked mode but slipping is nevertheless present between the impeller 40 and the turbine 44, a portion of the driver demand is transmitted through the lock-up clutch 48, while another portion of the driver demand is transmitted through a fluid path in the torque converter 22. The following equation, below is employed to provide an estimate of the portion of the driver demand that is transmitted through the fluid path of the torque converter (i.e., $Tq_{TC, fluid, dd}(t)$):

$$Tq_{TC,fluid,dd}(t) = Tq_{tu,dd}(t) - Tq_{TC,clutch}(t) \quad \text{(Equation 1)}$$

where: $Tq_{tu, dd}(t)$ is the driver demand and $Tq_{TC, clutch, dd}(t)$ is the estimate of the TC clutch torque.

Given the above fluid path torque, the target impeller speed ($\omega^*_{im}$) and the target torque converter torque ratio ($rt^*_{tc}$) are given by the following equations:

$$\omega^*_{im}(t) = \mathcal{F}_1(\omega_{tu}(t), Tq_{tu,dd}(t) - Tq_{TC,clutch}(t)), \text{ and} \quad \text{(Equation 2)}$$

$$rt^*_{TC}(t) = \mathcal{F}_2\left(\frac{\omega_{tu}(t)}{\omega^*_{im}(t)}\right), \quad \text{(Equation 3)}$$

where $\omega_{tu}$ is the turbine speed, and $\mathcal{F}_1$ and $\mathcal{F}_2$ are maps that characterize the model of the torque converter 22. Using the above target impeller speed and target torque converter torque ratio, the uncompensated TrnAin driver torque request ($Tq_{TrnAin,dd,uncomp}$) and the inertia compensation torque ($Tq_{TrnAin,comp}$) can be calculated as follows:

$$Tq_{TrnAin,dd,uncomp}(t) = \frac{Tq_{road\,load}(t) + m_{veh,eff}(t)a_{veh,dd}(t)}{rt_{fd}rt_{gearbox}rt^*_{TC}(t)}, \text{ and} \quad \text{(Equation 4)}$$

$$Tq_{TrnAin,comp}(t) = J_{TrnAin}\left[\frac{d\omega^*_{im}(t)}{dt} - \frac{d\omega^*_{tu}(t)}{dt}\right], \quad \text{(Equation 5)}$$

where $Tq_{roadload}$ (t) is the estimate of the resistive load on the vehicle, which accounts for tire drag forces, two load, aerodynamic drag forces, and road grade, $m_{veh, eff}$ (t) is the effective mass of the vehicle, accounting for the static mass of the vehicle and the inertias of the rotating drivetrain components, $a_{veh,dd}$ (t) is the desired vehicle acceleration, $rt_{fd}$ is the torque ratio of the final drive, $rt_{gearbox}$ is the torque ratio of the transmission gearbox, $rt^*_{TC}$ (t) is the target torque ratio of the torque converter, $J_{TrnAin}$ is the inertia of the rotating components at the transmission input of the drivetrain, $d\omega^*_{im}(t)/dt$ is the derivative of or change in the target impeller speed, and $d\omega_{tu}$ (t)/dt is the derivative of or change in the turbine speed.

A key problem in utilizing the target impeller speed and target torque converter torque ratio concerns the estimation of the torque converter clutch torque ($Tq_{TC,clutch}$) when the lock-up clutch 48 is slipping. The lock-up clutch 48 can slip, for example, when the torque converter 22 is transitioning between the unlocked mode and the locked mode. This slipping state can be further categorized into the following sub-states: (a) slip control, (b) capacity control, (c) transition-out-of-open, (d) transition-to-open, and (e) fast open. The slip control, capacity control, and transition-out-of-open sub-states all involve a lock-up clutch slip target ($\omega^*_{slip,trans}$), the magnitude of which is generated by the controller. The use of a lock-up clutch slip target ($\omega^*_{slip,trans}$) can: provide isolation between the TrnAin actuators and the wheels during transmission shifts; regulate the transmission gearbox input torque and gearbox input speed during shifts; and/or damp out engine NVH during tip-ins. The transition-to-open and fast open sub-states take place, for instance, during tip-ins involving transmission downshifts into lower gears. Given these sub-states, there are two options to estimate the torque that is transmitted through the lock-up clutch: either utilize the above-mentioned lock-up clutch slip target ($\omega^*_{slip,trans}$), or the torque converter clutch capacity.

When the lock-up clutch operates in any of the slip control, capacity control, and transition-out-of-open sub-states, the torque capacity of the lock-up clutch 48 can exhibit rapid and non-smooth variations as part of the regulation of the actual lock-up clutch slip to the target lock-up clutch slip ($\omega^*_{slip,trans}$) Rapid and non-smooth variations in the torque capacity of the lock-up clutch 48 would cause similar variation in the inertia compensation torque and as such, could adversely affect the quality of a shift between gear ratios in the transmission 24 as a result of rapidly varying the TrnAin torque demand. Accordingly, the torque that is transmitted through the lock-up clutch 48 when the lock-up clutch 48 operates in any of the slip control, capacity control, and transition-out-of-open sub-states is calculated using the lock-up clutch slip target ($\omega^*_{slip,trans}$) as follows:

$$\omega^*_{im,inf}(t) = \omega^*_{slip,trans}(t) + \omega_{tu}(t), \quad \text{(Equation 6)}$$

$$Tq_{TC,fluid,dd}(t) = \mathcal{F}_3(\omega^*_{im,inf}(t), \omega_{tu}(t))rt^*_{TC,inf}(t), \quad \text{(Equation 7)}$$

$$rt^*_{TC,inf}(t) = \mathcal{F}_2\left(\frac{\omega_{tu}(t)}{\omega^*_{im,inf}(t)}\right), \text{ and} \quad \text{(Equation 8)}$$

$$Tq_{TC,clutch}(t) = Tq_{tu,dd}(t) - Tq_{TC,fluid,dd}(t), \quad \text{(Equation 9)}$$

where $\mathcal{F}_3$ is another map that characterizes the model of the torque converter.

However, when the lock-up clutch 48 operates in either the transition-to-open sub-state or the fast open sub-state, the torque that is transmitted through the lock-up clutch 48 is calculated as follows:

$$Tq_{TC,clutch}(t) = Tq_{TC,clutch,capacity}(t)\text{sign}(Tq_{tu,dd}(t)) \quad \text{(Equation 10)}$$

where $Tq_{TC,clutch,capacity}$ is the torque capacity of the lock-up clutch 48 as reported by the controller 26.

The estimated bypass clutch torque and the resulting target impeller speed are used to modify the TrnAin torque. This modification includes an inertia compensation torque, which accounts for the fluid dynamics of the torque converter. Modification of the TrnAin torque value in this manner can help to ensure that the vehicle acceleration is smooth and is consistent with the driver request, irrespective of the state of the lock-up clutch 48.

Figure 1:
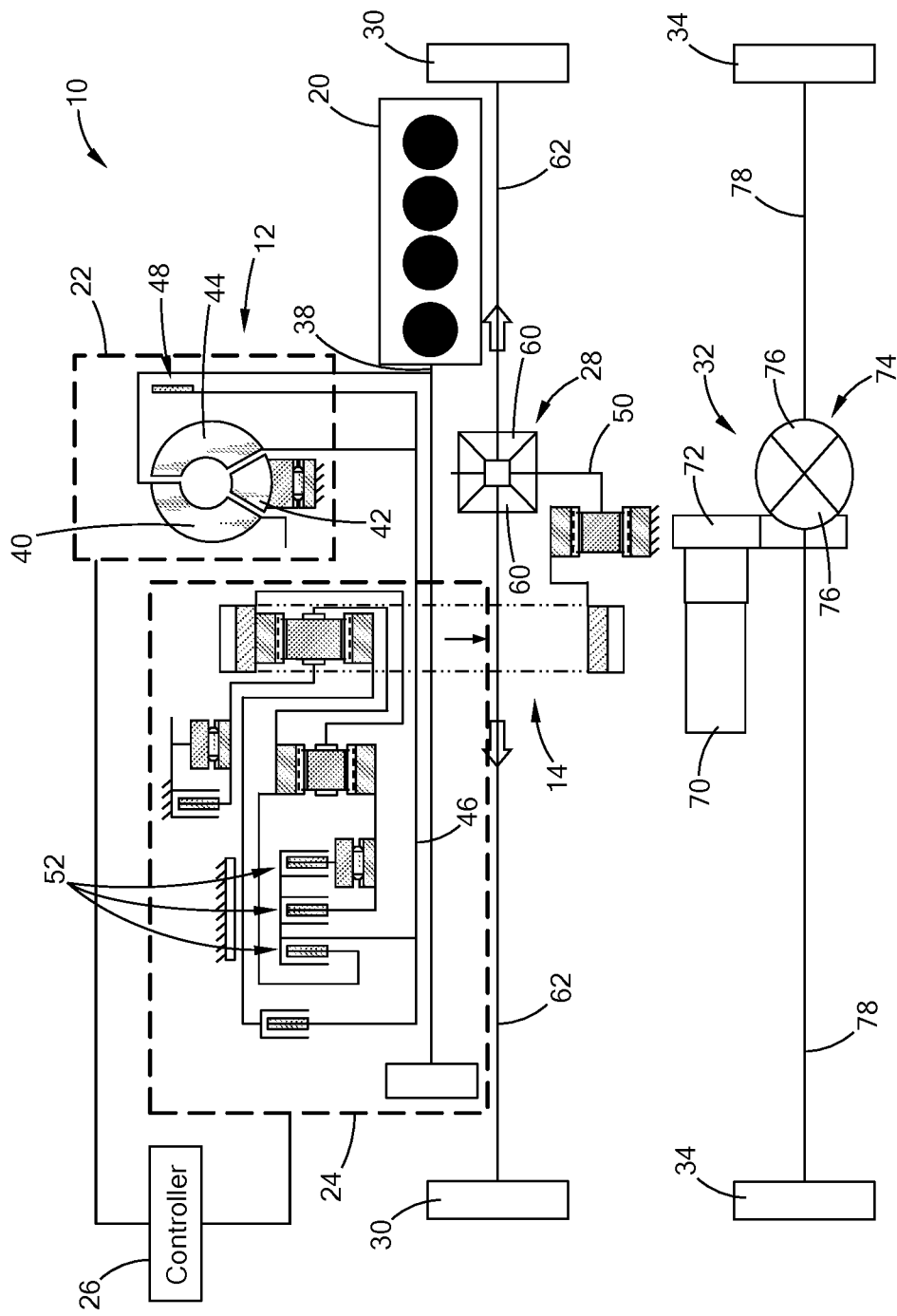
FIG. 1 is a schematic illustration of an exemplary vehicle having a controller that is configured to operate a powertrain and a drivetrain of a vehicle in accordance with the teachings of the present disclosure.
Figure 2:
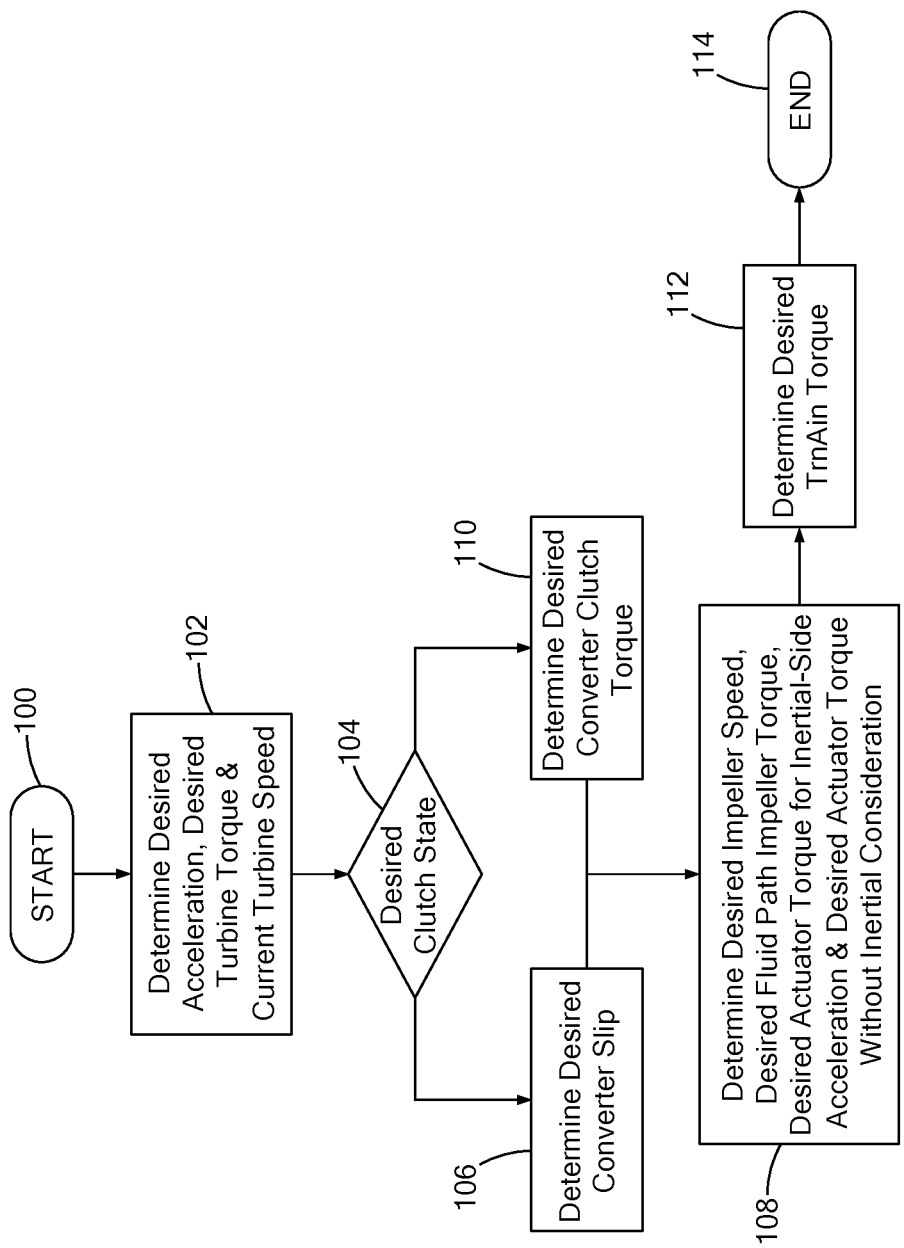
FIG. 2 is a schematic illustration in flowchart form of a method performed in accordance with the teachings of the present disclosure for determining an inertia compensation in a WTC architecture for a torque converter lock-up clutch that is operating in a slipping condition.

In FIG. 2, an exemplary method for determining a desired TrnAin torque when the lock-up clutch 48 (FIG. 1) of the torque converter 22 (FIG. 1) is operating in a slipping condition is illustrated in flowchart form. The method begins at bubble 100 and proceeds to block 102, where the controller 26 (FIG. 1) determines a desired vehicle acceleration, a desired turbine torque and a current rotational speed of the turbine 44 (FIG. 1). The method then proceeds to decision block 104.

In decision block 104, the controller 26 (FIG. 1) determines if the sub-state in which the lock-up clutch 48 (FIG. 1) is operating. If the sub-state in which the lock-up clutch 48 (FIG. 1) is operating is one of a slip control sub-state, a capacity control sub-state, or a transition-out-of-open sub-state (i.e., a sub-state in which the lock-up clutch slip target can be used to satisfactorily determine the torque that is transmitted through the lock-up clutch 48 (FIG. 1)), the method proceeds to block 106 where the controller 26 (FIG.

1) determines a value of the lock-up clutch slip target. The method then proceeds to block 108.

Returning to decision block 104, if the sub-state in which the lock-up clutch 48 (FIG. 1) is operating is one of a transition-to-open sub-state or a fast open sub-state (i.e., a sub-state in which the torque converter clutch capacity can be used to satisfactorily determine the torque that is transmitted through the lock-up clutch 48 (FIG. 1)), the method proceeds to block 110 where the controller 26 (FIG. 1) determines a value of the torque converter clutch capacity. The method then proceeds to block 108.

In block 108, the controller 26 (FIG. 1) determines the desired impeller speed, the desired fluid path impeller torque, the desired actuator torque for inertial-side acceleration and the desired actuator torque without inertial consideration in the manner that is described above in detail. The method then proceeds to block 112.

In block 112, the controller 26 (FIG. 1) determines a value of the desired TrnAin torque in the manner that is described above in detail. The method then proceeds to bubble 114 and ends.

Inertia Compensation of WTC Architecture For Transmission Gear Ratio Shifts

Returning to FIG. 1, shifts between gear ratios 52 in the transmission 24 are commonly accompanied by a rapid change in the desired vehicle acceleration ($a_{veh,ddd}$), the impeller speed ($\omega^*_{im}$), and the turbine speed ($\omega_{tu}$). This change in vehicle acceleration ($a_{veh,dd}$) may take place in part due to a transition from one look-up table, which is associated with the off-going gear ratio 52, to a second look-up table that is associated with the on-coming gear ratio 52. Furthermore, rapid changes in the impeller speed ($\omega^*_{im}$) and the turbine speed ($\omega_{tu}$) (illustrated in FIG. 6) are associated with the torque phase and the inertia phase of the shift. If rapidly changing values of vehicle acceleration ($a_{veh,dd}$) and turbine speed ($\omega_{tu}$) are used to compute the target impeller speed ($\omega^*_{im}$), then the resulting inertia compensation torque is of large amplitude and could potentially interfere with the shift by creating a situation where the shift between gear ratios 52 has a relatively undesirable characteristic, e.g., an undesirable amount of jerk.

Figure 3:
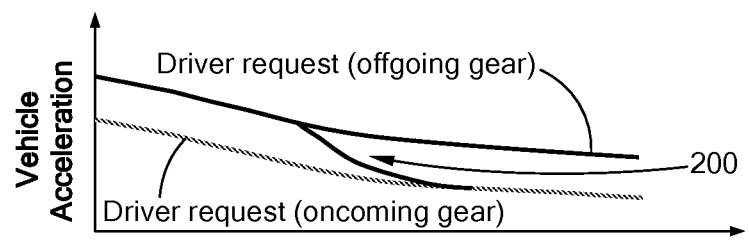
FIG. 3 is a plot that depicts vehicle acceleration as a function of time for an off-going gear ratio, an on-coming gear ratio, and in a region where the gear ratios are blended to permit smoother vehicle acceleration when a transmission of the vehicle powertrain is shifting from the off-going gear ratio to the on-coming gear ratio.
Figure 4:
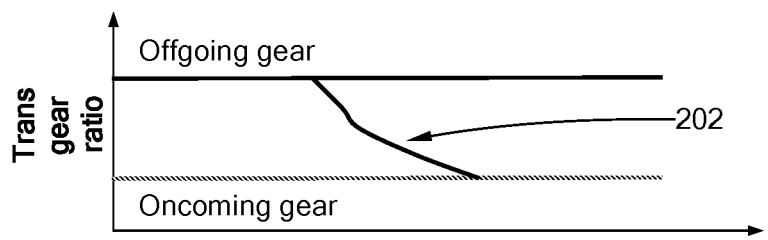
FIG. 4 is a plot that depicts a gear ratio as a function of time for an off-going gear ratio, an on-coming gear ratio, and in a region where the gear ratios are blended to permit smoother vehicle acceleration when a transmission of the vehicle powertrain is shifting from the off-going gear ratio to the on-coming gear ratio.

To alleviate or reduce this problem, during the transmission shift, one or more of the following techniques can be employed: (a) smoothly blending the value of vehicle acceleration ($a_{veh,dd}$) from the table of the off-going gear ratio 52 to that of the oncoming gear ratio 52 (see, e.g., region 200 in FIG. 3); (b) smoothly blending the value of the transmission gear ratio ($rt_{gearbox}$) from the value of the off-going gear ratio 52 to that of the on-coming gear ratio 52 (see, e.g., region 3 in FIG. 4); and (c) applying a low-pass filter to the turbine speed ($\omega_{tu}$) (see, e.g., Region 204 in FIG. 6). Blending of the value of vehicle acceleration ($a_{veh,dd}$) and/or blending of the value of the transmission gear ratio ($rt_{gearbox}$) may take into account the torque capacities of the slipping transmission clutches and/or the speed ratios across the slipping transmission clutches.

The values of the uncompensated TrnAin torque demand and the inertia compensation torque during a shift between gear ratios 52 in the transmission can be computed as follows:

$$Tq_{tu,dd,blend}(t) = \frac{Tq_{road\,load}(t) + m_{veh,eff}(t)a_{veh,dd,blend}(t)}{rt_{fd}rt_{gearbox,blend}(t)} \quad \text{(Equation 11)}$$

$$\omega^*_{im,shift}(t) = \mathcal{F}_1\left(\omega_{tu,filt}(t), Tq_{tu,dd,blend}(t) - Tq_{TC,clutch}(t)\right), \quad \text{(Equation 12)}$$

-continued $$rt^*_{TC,shift}(t) = \mathcal{F}_2\left(\frac{\omega_{tu,filt}(t)}{\omega^*_{im,shift}(t)}\right), \quad \text{(Equation 13)}$$

$$Tq_{TRn,Ain,dd,uncomp,shift}(t) = \quad \text{(Equation 14)}$$
$$\frac{Tq_{tu,dd,blend}(t) - Tq_{TC,clutch}(t)}{rt^*_{TC,shift}(t)} + Tq_{TC,clutch}(t),$$

$$\frac{d\omega^*_{tu,blend}(t)}{dt} = \frac{a_{veh,dd,blend}(t)rt_{gearbox,blend}(t)rt_{fd}}{R_{whl}}, \text{ and} \quad \text{(Equation 15)}$$

$$Tq_{Trn,Ain,comp,shift}(t) = J_{TrnAin}\left[\frac{d\omega^*_{im,shift}(t)}{dt} - \frac{d\omega^*_{tu,blend}(t)}{dt}\right]. \quad \text{(Equation 16)}$$

Figure 5:
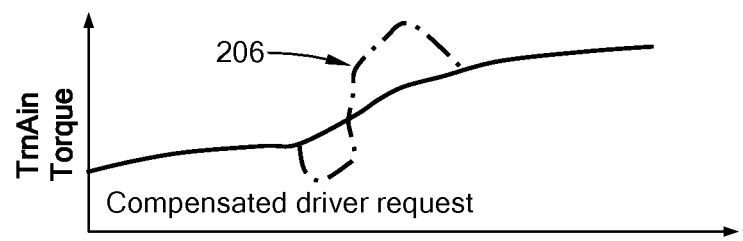
FIG. 5 is a plot that depicts the TrnAin torque as a function of time for a compensated driver request when the transmission of the powertrain is shifted from an off-going gear ratio to an on-coming gear ratio.

The above blending and filtering result in the determination of an inertia compensation torque having a relatively small magnitude during the shift between gear ratios 52 in the transmission 24 when an input from the driver (i.e., a position of an accelerator pedal) is constant or slowly changing (i.e., when the input from the driver is changing at a rate that is less than a predetermined threshold). Moreover, these blending procedures also manifest as a desirable torque-hole-fill behavior (see FIG. 5, where reference number 206 designates the "torque hole" that is filled by the blending procedures), which compensates for the change in the transmission gear ratio, and also as an appropriate behavior of the impeller speed (see region 208 in FIG. 6).

During shifts between gear ratios 52, the controller 26 modifies the TrnAin torque to respond only to changes in the urgency of the driver (e.g., accelerator pedal stomp). Other variations that occur during the shift, e.g., rapid changes in turbine speed, are ignored or smoothened out. Configuration in this manner can help to ensure: a smooth adjustment of the TrnAin torque to account for the change in the gear ratio 52 (i.e., torque-hole-fill), as well as to provide an inertia compensation torque that accounts for the fluid dynamics of the torque converter. The inertia compensation torque is calculated based on a model of the torque converter. As part of this calculation, the torque of the lock-up clutch 48 is estimated under various operating states of the torque converter 22. As indicated above, this compensation is mostly applied in response to a change in driver urgency.

Implementation of these methods may provide a consistent vehicle acceleration profile during gear shifts, irrespective of the state of the bypass clutch during the shifts. Implementation of these methods may also provide a smooth vehicle acceleration profile without any 'acceleration hole' (i.e., transient reduction in vehicle acceleration) during a shift event. The hole-filling modification of the TrnAin torque during transmission shifts can be calibrated as a function of the vehicle drive mode, e.g., sport mode, sand mode, snow mode, etc. For instance, during sport mode operation, the torque-hole-filling modification is not as smooth as during normal mode operation, which results in sportier shifts (i.e., jerkier vehicle acceleration response). In a case where multiple vehicle drive modes are available, the vehicle drive mode may be manually selectable by the driver, may default through programming to a particular mode, or may be inferred by the controller 26 using other measurements (e.g., GPS information, such as GPS information that suggests that the driver is driving the vehicle on a race track for example).

The described methods determine the TrnAin torque during transmission state transitions in order to deliver the desired vehicle acceleration. These methods are applicable for any source of the desired vehicle acceleration, i.e., human driver, or cruise control system, or automated vehicle system. For instance, the delivered vehicle acceleration during a shift between gear ratios 52 could be same whether initiated by accelerator pedal, or autonomous driver control, or a cruise control mechanism.

With reference to FIG. 7, an exemplary method for determining a desired TrnAin torque when the transmission 24 (FIG. 1) is shifting between gear ratios 52 (FIG. 1) is illustrated in flowchart form. The method begins at bubble 300 and proceeds to block 302 where the controller 26 (FIG. 1) determines a desired vehicle acceleration, a current gear ratio in which the transmission 24 (FIG. 1) is operating, and a current rotational speed of the turbine 44 (FIG. 1) of the torque converter 22 (FIG. 1). The method then proceeds to decision block 304.

In decision block 304, the controller 26 (FIG. 1) determines if the transmission 24 (FIG. 1) is being shifted between gear ratios 52 (FIG. 1). If the transmission 24 (FIG. 1) is not being shifted between gear ratios, the method proceeds to block 306.

Returning to decision block 304, if the controller 26 (FIG. 1) determines that the transmission 24 (FIG. 1) is being shifted between gear ratios 52 (FIG. 1), the method proceeds to block 308 where the controller 26 (FIG. 1) determines a target gear ratio 52 (FIG. 1), a blended value of the gear ratio and a (low-pass) filtered value of the turbine speed. One or more of these values may be determined in the manner that is described in detail above. The method then proceeds to block 306.

In block 306, the controller 26 (FIG. 1) determines a desired impeller speed, a desired fluid path impeller torque, a desired actuator torque for inertial-side acceleration, and a desired actuator torque without inertial compensation. One or more of these values may be determined in the manner that is described in detail above. The method then proceeds to block 310.

In block 310, the controller 26 (FIG. 1) determines an estimated lock-up clutch torque, a desired fluid path impeller torque, a desired impeller speed, a desired actuator torque without inertial consideration, and a desired actuator torque for inertial-side acceleration. One or more of these values may be determined in the manner that is described in detail above. The method then proceeds to block 312.

In block 312, the controller 26 (FIG. 1) determines a value of the TrnAin torque. This value may be determined in the manner that is described in detail above. The method then proceeds to bubble 314 where control ends.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A method for controlling a source of propulsive rotary power in a vehicle powertrain of a vehicle, the vehicle powertrain having a transmission and a torque converter, including a lock-up clutch, that is disposed in a power path between the source of rotary power and the transmission, the method comprising:

determining, via a controller, a compensated TRNAIN torque request, the compensated TRNAIN torque request including an uncompensated TRNAIN torque request and an inertia compensation component, the inertia compensation component being indicative of a torque transmitted through the torque converter over a fluid path of the torque converter that is disposed between an input of the torque converter and an output of the torque converter, wherein the uncompensated TRNAIN torque request is a value calculated using a desired vehicle acceleration value; and controlling, via the controller, operation of the source of rotary power to satisfy the compensated TRNAIN torque request when the lock-up clutch is operating in a slipping state.

2. The method of claim 1, wherein prior to determining the compensated TRNAIN torque request, the method comprises:

determining a sub-state of the slipping state in which the torque converter is operating; and determining an estimate of a torque converter clutch torque $[T_{qTC,\ clutch}(t)]$ based in part on the sub-state of the slipping state in which the torque converter is operating.

3. The method of claim 2, wherein the estimate of the torque converter clutch torque $[T_{qTC,\ clutch}(t)]$ is related to an amount of slip or relative rotation between the input of the torque converter and the output of the torque converter when the torque converter is operating in a first sub-state of the slipping state.

4. The method of claim 3, wherein the first sub-state of the slipping state comprises a sub-state selected from a group of sub-states consisting of: a slip control sub-state, a capacity control sub-state, and a transition-out-of-open sub-state.

5. The method of claim 3, wherein the estimate of the torque converter clutch torque $[T_{qTC,\ clutch}(t)]$ is determined from the formula:

$$Tq_{TC,clutch}(t) = Tq_{tu,dd}(t) - Tq_{TC,fluid,dd}(t)$$

where:

$T_{qTC,\ clutch}(t)$ is the torque converter clutch torque;
$T_{qtu,dd}(t)$ is a torque converter desired torque; and
$T_{qTC,fluid,\ dd}(t)$ is the portion of the torque converter desired torque that is transmitted through the fluid path of the torque converter.

6. The method of claim 3, wherein the estimate of the torque converter clutch torque $[T_{qTC,\ clutch}(t)]$ is proportional to a torque capacity of a torque converter clutch $[T_{qTC,\ clutch,\ capacity}(t)]$ when the torque converter is operating in a second sub-state of the slipping state.

7. The method of claim 6, wherein the second sub-state of the slipping state comprises a sub-state selected from a group of sub-states consisting of: a transition-to-open sub-state and a fast open sub-state.

8. The method of claim 6, wherein the estimate of the torque converter clutch torque $[T_{qTC,\ clutch}(t)]$ is determined from the formula:

$$Tq_{TC,clutch}(t) = Tq_{TC,clutch,capacity}(t)\ \text{sign}(Tq_{tu,dd}(t))$$

where:

$T_{qTC,\ clutch}(t)$ is the torque converter clutch torque;
$T_{qTC,\ clutch,\ capacity}(t)$ is the torque capacity of the torque converter clutch; and
$T_{qtu,dd}(t)$ is a torque converter desired torque.

9. The method of claim 2, wherein the estimate of the torque converter clutch torque $[T_{qTC,\ clutch}(t)]$ is proportional to a torque capacity of a torque converter clutch $[T_{qTC,\ clutch,\ capacity}(t)]$ when the torque converter is operating in a first sub-state of the slipping state.

10. The method of claim 9, wherein the first sub-state of the slipping state comprises a sub-state selected from a group of sub-states consisting of: a transition-to-open sub-state and a fast open sub-state.

11. The method of claim 9, wherein the estimate of the torque converter clutch torque [$T_{qTC,\ clutch}(t)$] is determined from the formula:

$$T_{qTC,\ clutch}(t) = Tq_{TC,clutch,capacity}(t) \text{sign}\ (Tq_{tu,dd}(t))$$

where:

$T_{qTC,\ clutch}(t)$ is the torque converter clutch torque;

$T_{qTC,\ clutch,\ capacity}(t)$ is the torque capacity of the torque converter clutch; and $T_{qtu,dd}(t)$ is a torque converter desired torque.

12. The method of claim 1, wherein the desired vehicle acceleration value is based on a manually provided driver input, an input from a cruise control system, or an input from an automated vehicle system.

13. The method of claim 1, wherein the desired vehicle acceleration value is based on a rate of a displacement of an accelerator pedal of the vehicle.

* * * * *